(12) United States Patent
Obasanjo et al.

(10) Patent No.: US 8,214,883 B2
(45) Date of Patent: Jul. 3, 2012

(54) USING SOCIAL NETWORKS WHILE RESPECTING ACCESS CONTROL LISTS

(75) Inventors: Oludare Obasanjo, Redmond, WA (US); David Nichols, Redmond, WA (US); Bhupinder Sethi, Redmond, WA (US); Paul Ming, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 912 days.

(21) Appl. No.: 11/975,771

(22) Filed: Oct. 22, 2007

(65) Prior Publication Data

US 2009/0106822 A1 Apr. 23, 2009

(51) Int. Cl.
*G06F 7/04* (2006.01)
(52) U.S. Cl. .......................................... 726/4
(58) Field of Classification Search ................. 726/4
See application file for complete search history.

(56) References Cited

U.S. PATENT DOCUMENTS

| | | |
|---|---|---|
| 2002/0124053 A1 | 9/2002 | Adams et al. |
| 2004/0088325 A1 | 5/2004 | Elder et al. |
| 2005/0159970 A1 | 7/2005 | Buyukkokten et al. |
| 2005/0165891 A1 | 7/2005 | Moody et al. |
| 2005/0197846 A1 | 9/2005 | Pezaris et al. |
| 2005/0198031 A1 | 9/2005 | Pezaris et al. |
| 2005/0267766 A1* | 12/2005 | Galbreath et al. ............ 705/1 |
| 2006/0143081 A1 | 6/2006 | Argaiz |
| 2006/0143236 A1 | 6/2006 | Wu |
| 2006/0184464 A1 | 8/2006 | Tseng et al. |
| 2006/0184997 A1 | 8/2006 | La Rotonda et al. |
| 2006/0218153 A1 | 9/2006 | Voon et al. |
| 2006/0248573 A1 | 11/2006 | Pannu et al. |
| 2007/0038594 A1* | 2/2007 | Goodwin et al. ............. 707/2 |
| 2007/0130164 A1 | 6/2007 | Kembel et al. |
| 2008/0046976 A1* | 2/2008 | Zuckerberg .................. 726/4 |

FOREIGN PATENT DOCUMENTS

| | | |
|---|---|---|
| KR | 10-2007-0005743 A | 1/2007 |
| KR | 10-2007-0008144 A | 1/2007 |

OTHER PUBLICATIONS

'International Search Report and Written Opinion Received for PCT Application No. PCT/US2008/079099, mailed on May 22, 2009, 10 pages.
"Buddylist: list your social network", http://drupal.org/handbook/modules/buddylist, Jul. 5, 2007.
"Higgins, The Trust Framework", http://www.eclipse.org/proposals/etf/, Jul. 5, 2007.
Carminati, et al., "Rule-Based Access Control for Social Networks", Date: 2006, pp. 1734-1744.
Grzonkowski et al., "A DRM Solution Based on Social Networks and Enabling the Idea of Fair Use", Media in Transition 5 (MiT5): Creativity, Ownership and Collaboration in the Digital Age, Cambridge, MA, Apr. 27-29, 2007.

* cited by examiner

*Primary Examiner* — Cordelia Zecher (57) ABSTRACT

Techniques are described for use with social networks and associated access information, such as access control lists, indicating which users are allowed to access the social networks. The social networks represent relationships between users. The social networks and access control lists may be represented in a graph which is traversed in connection with performing different operations using the social networks.

20 Claims, 10 Drawing Sheets

| User | Social network list | | | ACL |
|---|---|---|---|---|
| A | A1 | A2 | A3 | A |
| A1 | B1 | B2 | B3 | A, A1 |
| B2 | C1 | C2 | C3 | A, B2 |

USING SOCIAL NETWORKS WHILE RESPECTING ACCESS CONTROL LISTS

BACKGROUND

Social networking websites may be characterized as a category of websites which allow users to exchange information. Social networking websites also allow users to create online profiles and social networks. A social network may be defined by an individual as a list of other users expressing a personal or professional set of relationships between the individual and the others included in the list. Existing social networking websites define public social networks including those users from a particular geographic region, workplace, or school affiliation. The public social networks are accessible to all users of the website. Membership to these public social networks may be self declared by each user, such as based on information entered in a user profile. Membership to a particular public social network based on a self-declared affiliation may be verified such as by requiring a user declaring to work for a particular employer to supply an email address including a domain name related to the employer. Other membership may not be verified, such as a user indicating he/she resides in a particular city and state. The defined public social networks may be used collectively to discover indirect relationships between different users of the website. A first user may inquire how he/she is possibly connected to another second user. The social networking website may use the public social networks to provide the first user with information indicating how the first user is connected to the second user. For example, both the first and second users may have gone to the same school or may work for the same employer. Social networking sites also allow a user to define private social networks in which the list of users representing a private social network, such as a list of friends, may be viewable by the owner defining the list and members of the list. A user may also filter electronic content, such as blog entries, based on membership in a public or private social network.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are described for use with serial networks and associated access information, such as access control lists, indicating which users are allowed to access the social networks. The social networks represent relationships between users. The social networks and access control lists may be represented in a graph which is traversed in connection with performing different operations using the social networks.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
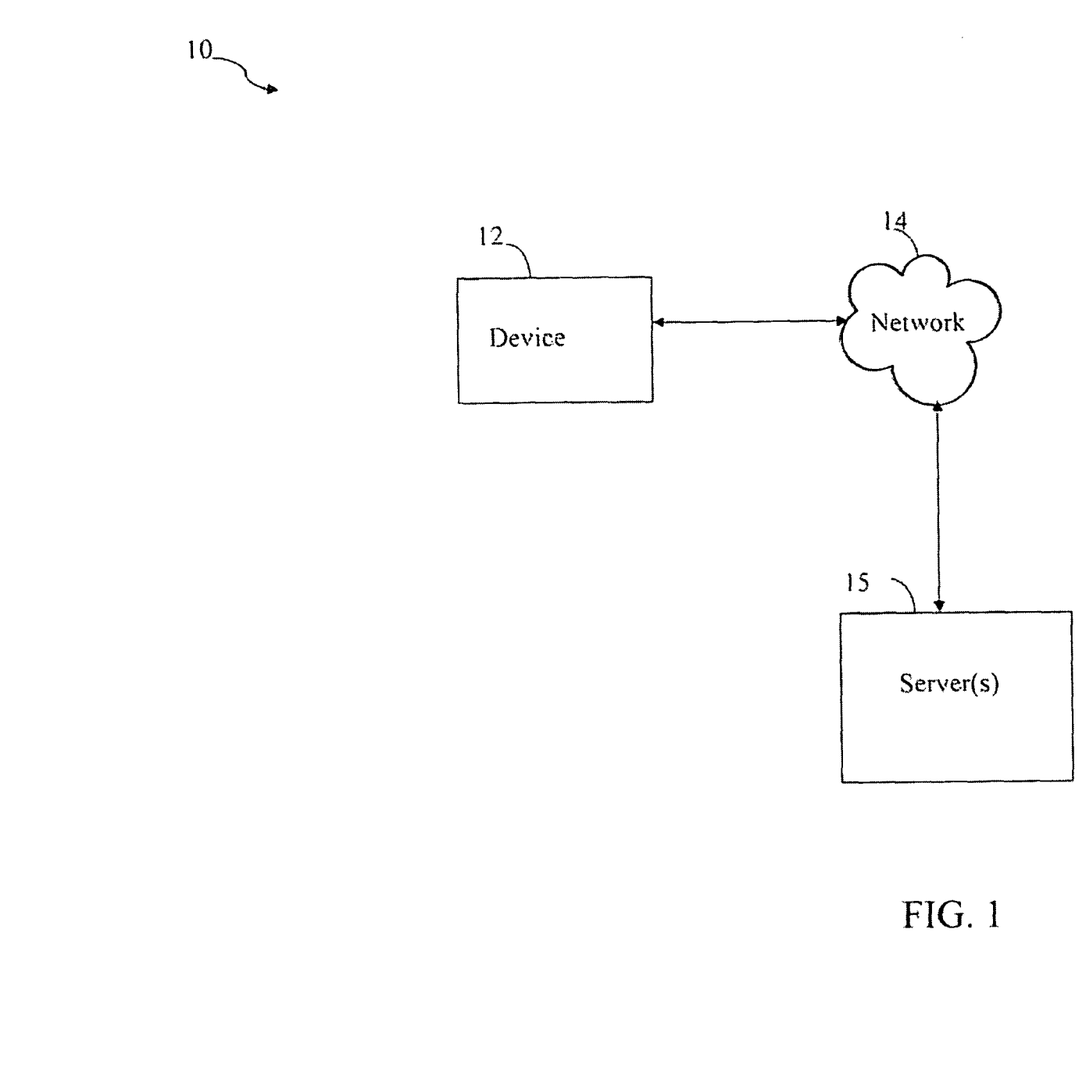
FIG. 1 is an example of an embodiment illustrating an environment that may be utilized in connection with the techniques described herein.

Referring to FIG. 1, illustrated is an example of a suitable computing environment in which embodiments utilizing the techniques described herein with social networking sites may be implemented. The computing environment illustrated in FIG. 1 is only one example of a suitable computing environment and is not intended to suggest any limitation as to the scope of use or functionality of the techniques described herein in connection with using an access control list with a social network.

Social networking websites may be characterized as a category of websites which allow users to exchange information. Social networking websites allow users to create online profiles and define social networks. A social network may be defined by one individual as a list of other users expressing a personal or professional set of relationships between the individual defining the social network and those individuals included in the network. Social networks represent both a collection of ties between people and the strength of those ties in the context of the relationships represented by the particular social network. For example, a social network may be created to represent friends, family, co-workers, and the like. Social networks and their use in connection with techniques herein are described in following paragraphs.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Included in FIG. 1 are a device 12, a network 14, and a server 15. The device 12 may be, for example, a computer, such as a personal computer, having a display output device and an input device providing for interactive I/O with a user thereof. In following paragraphs, additional details are provided with respect to the device 12. However, the same details may also apply to one or more other devices that may be connected to the network 14 in an embodiment. Although the example 10 of FIG. 1 includes only a single device and a single server, an embodiment utilizing the techniques herein may include any number of devices and other components.

The device 12 included in FIG. 1 is exemplary for purposes of illustrating the techniques described herein in connection with software components. In one embodiment, any device 12 providing the functionality described herein may be included in an embodiment. The device 12 may include a processor used to execute code included in one or more program modules. Described in more detail elsewhere herein are program modules that may be executed by the device 12 in connection with the techniques described herein. The device 12 may operate in a networked environment and communicate with the server 15 and other computers or components not shown in FIG. 1. As described herein, the device 12 may be a personal computer. In other embodiments, the functionality of device 12, or the device 12 itself, may be included in another component in accordance with a particular environment in which the device 12 is utilized.

It will be appreciated by those skilled in the art that although the device 12 is shown in the example as communicating in a networked environment, the device 12 may communicate with other components utilizing different communication mediums. For example, the device 12 may communicate with one or more components utilizing a network connection, and/or other type of link including, but not limited to, the Internet, an intranet, or other wireless and/or hardwired connection(s) to the server 15 and/or other components.

It should be noted that although the device 12 is illustrated as having network connectivity to the server 15, the techniques described herein may be used in connection with a device directly connected to the server 15 without a network.

Figure 2:
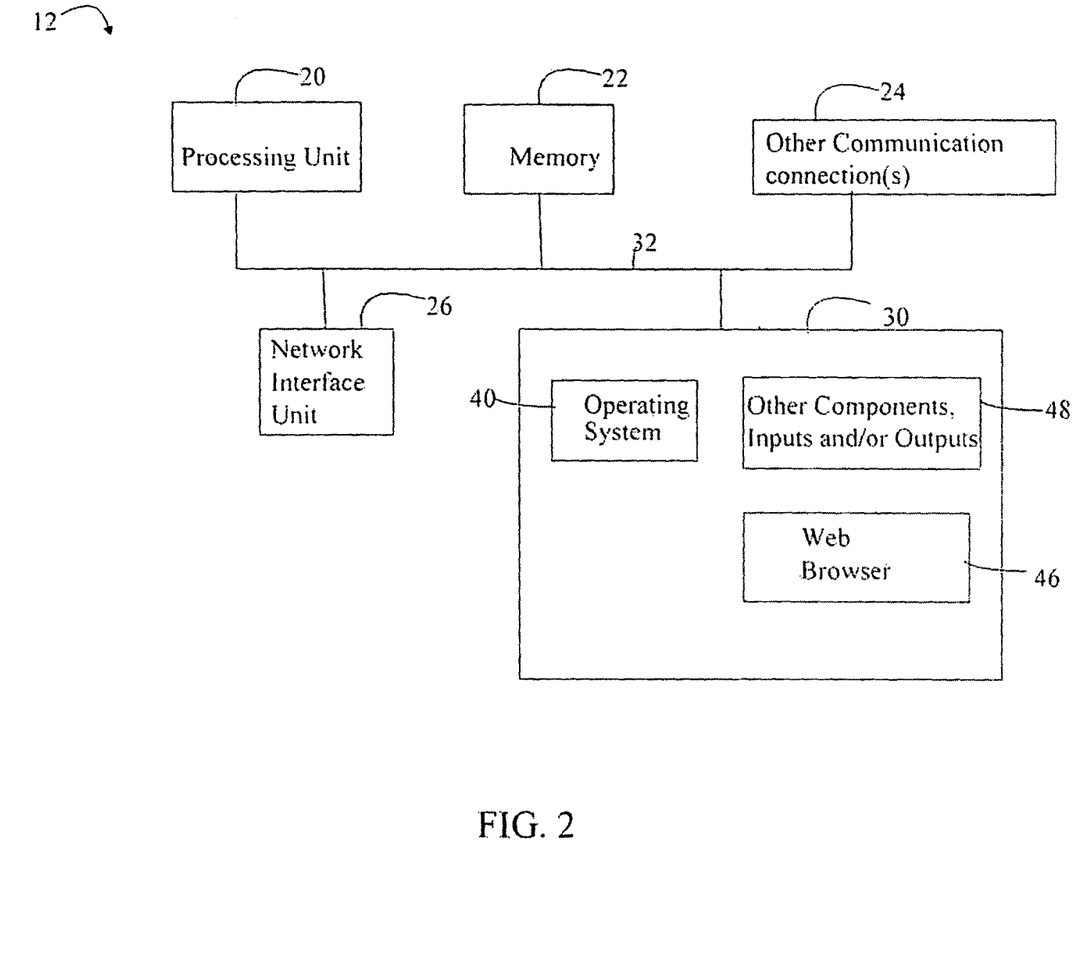
FIG. 2 is an example of an embodiment of components that may comprise a device of FIG. 1.

Referring to FIG. 2, shown is an example of components that may be included in the device 12 as may be used in connection with performing the various embodiments of the techniques described herein. The device 12 may include one or more processing units 20, memory 22, a network interface unit 26, storage 30, one or more other communication connections 24, and a system bus 32 used to facilitate communications between the components of the device 12.

Depending on the configuration and type of device 12, memory 22 may be volatile (such as RAM), non-volatile (such as ROM, flash memory, etc.) or some combination of the two. Additionally, the device 12 may also have additional features/functionality. For example, the device 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the device 12. The storage 30 in one embodiment may be a mass-storage device with associated computer-readable media providing non-volatile storage for the device 12. Although the description of computer-readable media as illustrated in this example may refer to a mass storage device, such as a hard disk or CD-ROM drive, it will be appreciated by those skilled in the art that the computer-readable media may be any available media that can be accessed by the device 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by device 12.

The device 12 may also contain communications connection(s) 24 that allow the computer to communicate with other devices and components such as, by way of example, input devices and output devices.

In one embodiment, the device 12 may operate in a networked environment as illustrated in FIG. 1 using logical connections to remote computers through a network. The device 12 may connect to the network 14 of FIG. 1 through a network interface unit 26 connected to bus 32. The network interface unit 26 may also be utilized in connection with other types of networks and/or remote systems and components.

One or more program modules and/or data files may be included in storage 30. During operation of the device 12, one or more of these elements included in the storage 30 may also reside in a portion of memory 22, such as, for example, RAM for controlling the operation of the user computer 12. The example of FIG. 2 illustrates various components including an operating system 40, web browser 46, and other components, inputs, and/or outputs 48.

The operating system 40 may be any one of a variety of commercially available or proprietary operating systems. The operating system 40, for example, may be loaded into memory in connection with controlling operation of the device 12.

The web browser 46 may be a software application installed on the device 12. Using the web browser, a user may access information from web pages at a website on the Internet or other local area network. A user of device 12 may use the web browser 46 to connect to the server 15.

In connection with the techniques herein, the server 15 may be used to host a social networking website. The server 15 may include software thereon which allows users, such as a user of device 12, to create profiles, define and utilize social networks, and the like. A user may define a social network expressing a relationship between the user and other users. A social network may be expressed as a list of other users. The list may have a title or label indicating the context of the relationship between the individual owner defining the list and the members of the social network. For example, a social network may be defined for each of friends, family, co-workers, classmates, membership of a particular organization, and the like.

A user may restrict or control access of her social networks to particular individuals. As will be described in following paragraphs, an access control list may be defined by a first user to designate which other users are granted access and allowed to view the one or more social networks defined by the first user.

It should be noted that the server 15 of FIG. 1 may include one or more computers with components similar to those described in connection with FIG. 2. Rather than include a web browser application, the server may include one or more software components to provide the various services hosted on the server 15. For example, the server 15 may include software components which allow a user to define an access control list. The access control list may be used to specify access information indicating which other users of the website are allowed access to one or more of the user's social networks. The server 15 may also include software components to perform one or more different operations utilizing the access control lists. For example, the server 15 may allow a user to inquire whether the user is related to another user. As another example, a first user may inquire as to what other users of the website are related to the first user within a certain distance or number of hops, each hop representing a different relationship between two users. The foregoing are described in more detail in following paragraphs.

The social networks defined by a user may be represented as a list. The social networks may be used to track relationships between users and used to discover indirect relationships between users. The social networks may be used to define these direct and indirect relationships between users represented in a graphical form.

Figure 3:
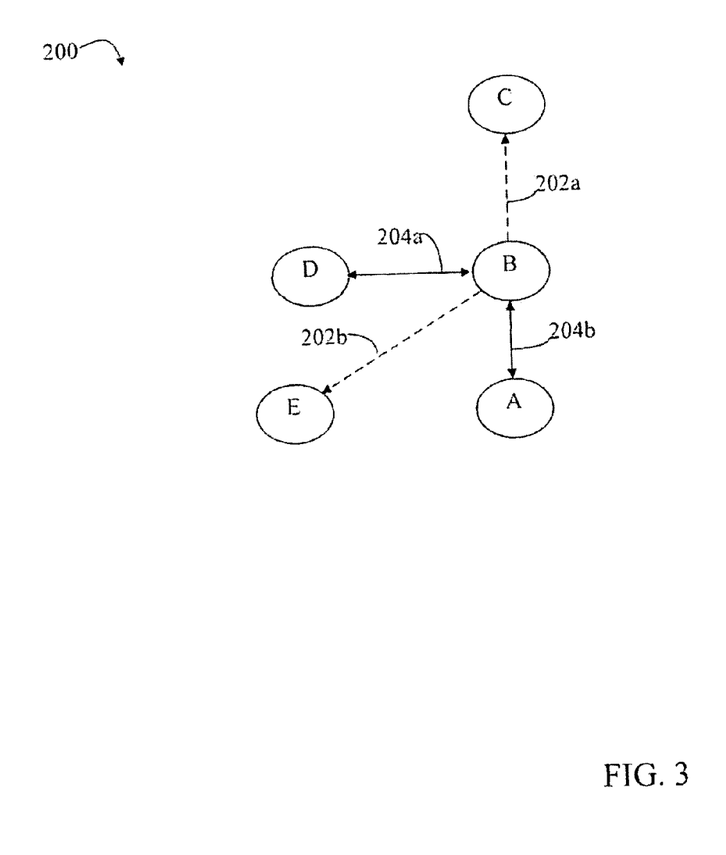
FIG. 3 is a first example of a graphical illustration utilizing social networks and access control lists.

Referring to FIG. 3, shown is an example graphically illustrating relationships between users. In the example 200, each user is represented as a node in the graph. Social relationships between users are indicated by the edges which are solid lines. A solid line between a first node to a second node in the example 200 indicates that the first node and the second node are included in a same social network. In this example, social networks are illustrated using bi-directional solid edges indicating that paths between users may be formed using links in both directions. As will be illustrated in connection with other examples, social networks may be represented using unidirectional solid lines depending on the particulars of how the social network is implemented in an embodiment. An edge which is a dashed line from a first node to a second node is used to indicate that the second node is included on the first node's access control list. In other words, the second node is allowed to view the first node's relationships as indicated by the first node's social network list(s). With reference to FIG. 3, the example 200 includes 5 nodes A, B, C, D, and E, each node representing a different user. User B has a social network defined which includes nodes A and D as indicated, respectively, by 204b and 204a. User B has specified via her access control list that only C and E can view her relationships. Elements 202a and 202b, respectively, represent that C and E can view or access B's relationships as indicated by B's social network lists.

Social networks as represented in the example 200 may be used to measure social connectedness for a variety of different reasons. For example, a user may inquire whether she is connected, or related, to another user. With reference to the example 200, if there is a connection between 2 users, a path in the graph connects the nodes representing the 2 users. Such information may be useful, for example, in determining what individuals to ask for an introduction or referral to another user. By determining a path exists from a starting node to a target node, the starting node (user) may determine what other intervening nodes form a path to the target node. The users represented by the intervening nodes may be used to obtain the introduction or referral to the user represented by the target node. In connection with the techniques herein, access control lists may be used to determine if the starting node is allowed to view the nodes including in the social networks of others used in forming the path.

Another type of operation a user may perform is to determine all other users (nodes) which are connected within a certain degree or distance. In other words, the user may determine all other users which are within a certain distance, such as a number of hops. For example, if each user has a "friends" list defined, a user may inquire as to all other users who are within 2 or fewer hops representing who are "friends" of "friends". The closer a first user is to a second user, the greater the degree of connectedness or closeness in a social network. A user may utilize proximity to others in a social network to determine trustworthiness, confidence, and the like, in connection with interactions with others. Such interactions may include, for example, performing a transaction with another, having another perform a service, determining validity or trustworthiness of statements of another made online, and the like. In connection with the techniques herein, the foregoing operation may be performed using access control lists in determining what paths are viewable to an inquiring user.

With reference to the example 200, suppose user A wants to determine if A is related to D, thus having a path from A to D. Using the information of the example 200, there is a path from A to D (e.g., A-B-D). However, in response to A's inquiry, no information regarding the path or connection between A and D is communicated to A because A does not have access to B's social network.

More detailed examples will be described in order to illustrate the techniques herein using access control lists with social networks. In connection with examples of FIGS. 4, 5, 5A, 6, and 6A, social networks may be represented using solid edges or lines between nodes in which the solid edges are unidirectional. This is described in more detail and illustrated in following paragraphs.

Figure 4:
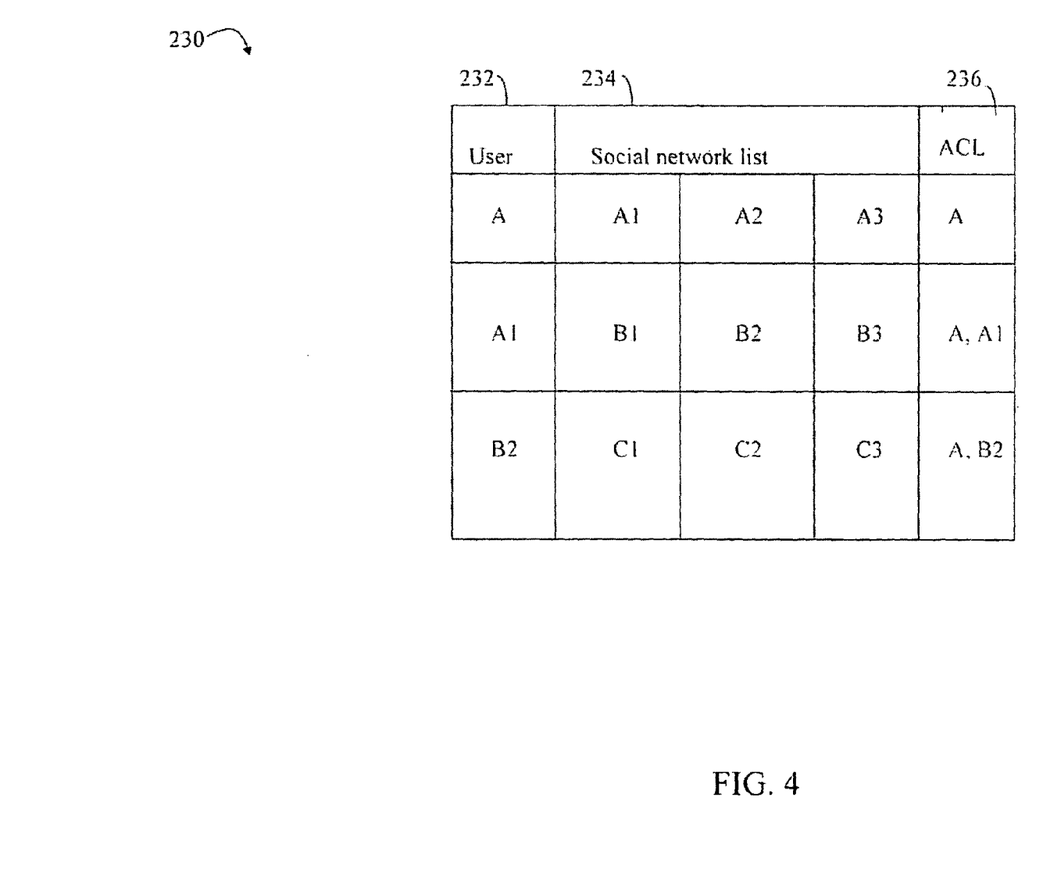
FIG. 4 is a table representing social networks and associated access control lists in connection with a second example.

Referring to FIG. 4, shown is a table of social networks defined for users. The table 230 includes a first column 232 indicating users having social networks defined in 232. For each row, the access control list for the social networks of 232 is indicated in 236. In this example, only a single social network is defined for each user, A, A1 and B2 (e.g., in column 232), for purposes of simplicity in illustration. However, it will be appreciated by those skilled in the art that the techniques herein may be applied individually to each social network list for a user, or to groups of social network lists for each user.

With reference to the table of 230, user A has a social network list including users A1, A2 and A3. User A has access to A's own social network as indicated by column 236 in the first row of the table 230. User A1 has a social network including users B1, B2 and B3. Users A and A1 have access to A1's social network as indicated by column 236 in the second row of table 230. User B2 has a social network including users C1, C2 and C3. Users A and B2 have access to B2's social network as indicated by column 236 in the third row of table 230.

Figure 5:
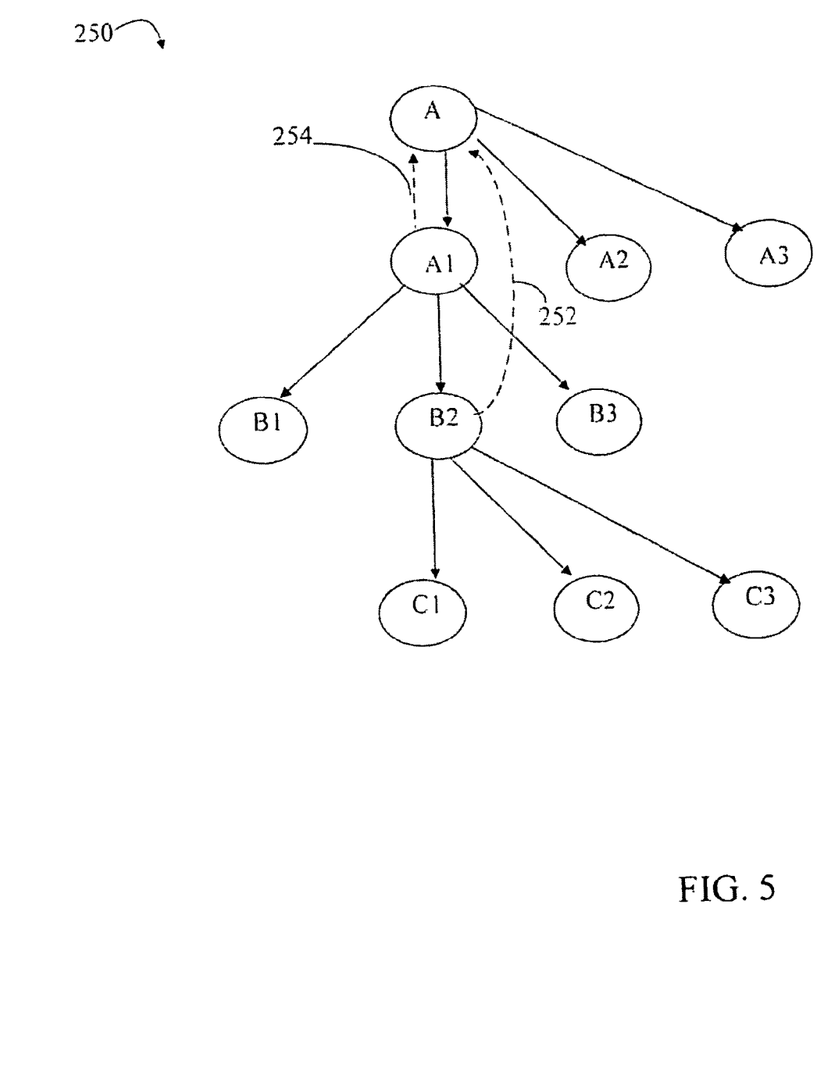
FIG. 5 is a graphical illustration of the information from FIG. 4.

The relationships defined by the social networks and the access to those social networks of FIG. 4 are represented in FIG. 5 using unidirectional links for the social networks.

Referring to FIG. 5, shown is a graph representing the social networks and access control lists of FIG. 4 using the conventions as described in connection with FIG. 3 with one variation in that the solid edges representing the defined social networks are unidirectional. In connection with the unidirectional representation of social networks, a solid line from a first node to a second node indicates that the first and second nodes are included in the same social network. More specifically, the second node is included in a social network of the first node and paths between users may be formed using links in the indicated direction. The dashed edges represent the access control lists indicating which nodes have access to another node's defined social network. In this example 250, the edges 252 and 254 indicate that A has access to view the social networks of node A1 and node B2. Each node in FIG. 5 has access to its own social network list. For purposes of simplicity, this is not illustrated in the graph of FIG. 5.

Different operations may be performed with the social networks utilizing the access control lists. As described above, a user may inquire as to whether she is related to another user. As an example, A may inquire how A is related to user B1. The existence of such a relationship may be determined by determining a path from A to B1 utilizing the access control lists associated with the social networks. As another exemplary operation, user A may want to determine all users who are within 2 hops. In connection with both of these operations, the inquiring user, A, is allowed to view only those social networks for which A is granted permission. Any path from node A which includes a connection that A does not have permission to view or access is not used. Processing is performed such that if A does not have permission to view a node's social networks, any connections using the node's social networks are omitted. The inquiring node must be on the access control list of each connecting or intervening list used to form the path from the inquiring node to the endpoint. Otherwise, the inquiring node cannot see the path to the endpoint. If an inquiring node does not have permission to view a list representing a social network, the list is treated as being empty or having no members. The foregoing is explained in more detail in following paragraphs.

With reference to FIG. 5, A may inquire whether A is related to C3. In one embodiment, a default value of 3 hops may be used indicating that the search is performed for all paths which are 3 or less hops from A. Other embodiments may use other default values as a parameter for limiting the searching performed. A breadth first traversal of the graph may be performed to determine all paths formed by the solid edges originating from node A which are 3 or less hops. Once all such paths of 3 hops or less are determined, a further determination may be made as to whether one of the paths includes a path from A to C3. A breadth first traversal explores nodes at a same level or distance before proceeding to the next level of descendant nodes. Before traversing edges representing social network relationships (solid edges) from a descendant node, a determination is made as to whether A is on the access control list of the descendant node. If A is on the access control list of the descendant node, solid edges extending from the descendant node are also traversed. Otherwise, the solid edges extending from the descendant node are not traversed. In connection with a breadth first search of the example 250 to determine if there is a path from A to C3, nodes A1, A2 and A3 (nodes 1 hop away from A) are first considered. For node A1, a determination is made as to whether A is on A1's access control list. A is on A1's access control list as indicated by 254 so nodes B1, B2, and B3 are considered. Since A2 and A3 have no children, traversal proceeds to the next level in the breadth first search in which B1, B2 and B3 (i.e., those nodes two hops away from A) are processed. Only node B2 has any children. With respect to B2, a determination is made as to whether A is on B2's access control list. A is on B2's access control list as indicated by 252 so nodes C1, C2 and C3 are considered (i.e., those nodes three hops away from A). In connection with the traversal for all paths of three hops or less, processing stops since nodes C1, C2 and C3 are at the maximum distance under consideration. In connection with the breadth-first traversal just described, a single path from A to C3 is determined and the path is A, A1, B2, C3.

As a further example, A may inquire whether A is related to B2. The breadth-first search as described above may be performed to determine paths from A having a distance of 3 or less. A determination may then be made as to whether there is a path from A to B2. In this case, a determination is made that there is a path from A to B2 and the path is A, A1, B2. The target node, B2, does not have to be an endpoint of the paths traversed. Rather, the target node of the inquiry may also be an intervening node and a path may be specified from the starting point (inquiring node) to the intervening node.

Figure 5A:
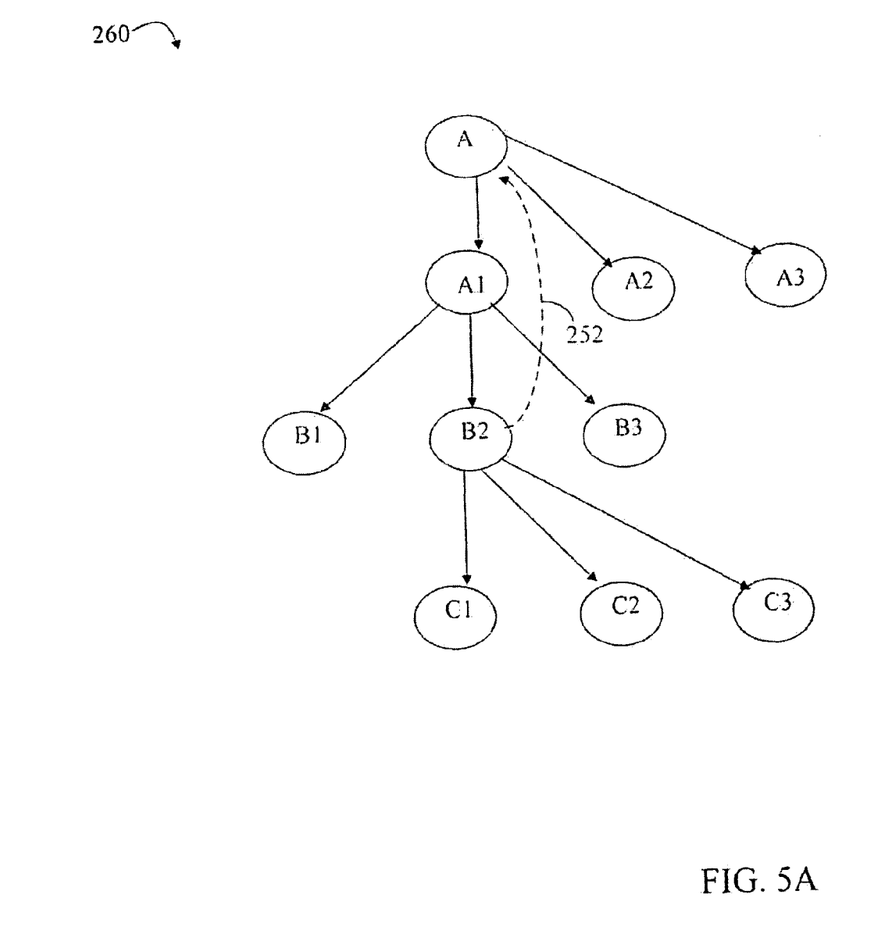
FIG. 5A is an example using a variation of the graph from FIG. 5.

Referring to FIG. 5A, shown is an example 260 that is a variation to the graph of FIG. 5. The example 260 includes the graph of FIG. 5 with the removal of the dashed edge 254. By removing edge 254, the example 260 illustrates a graph representing the case in which A is not on A1's access control list and thus, A cannot see A1's list. In accordance with the representation of 260, if A now inquires whether A is related to C3, the answer is no because A cannot view A1's list. In performing a breadth-first search in this instance, the nodes A1, A2 and A3 (distance=1 from A) are considered. A determination is made that A does not have access to A1's social network lists so descendant nodes B1, B2 and B3 are not considered. Nodes A2 and A3 have no children so the traversal terminates and no paths are found from A to C3.

Figure 6:
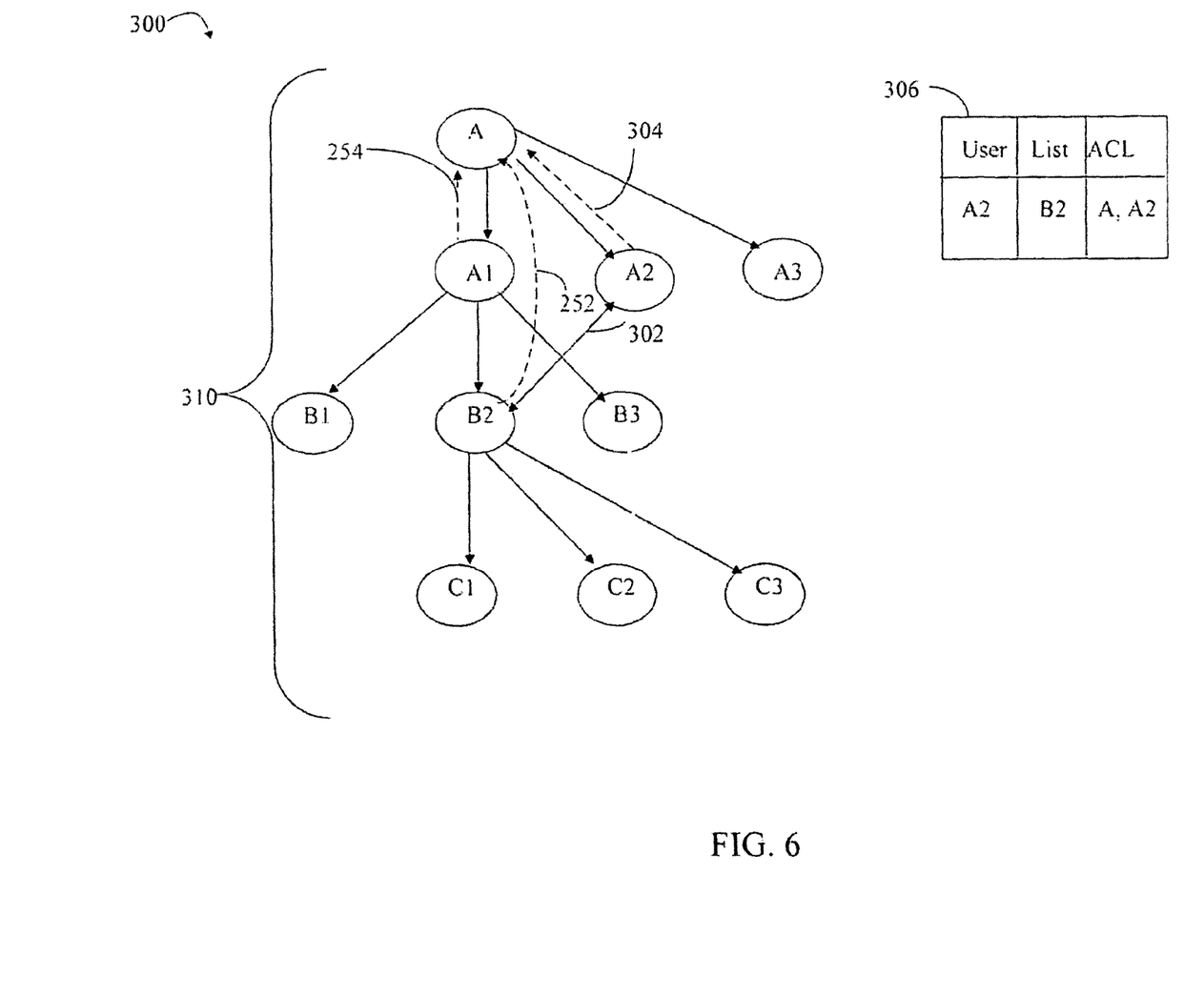
FIG. 6 is another example of a graphical illustration utilizing social networks and access control lists.

With reference to FIG. 6, another example 300 is illustrated. The example 300 includes a graph 310 which is the same as illustrated in FIG. 5 with the addition of one new solid edge 302 and one new dashed edge 304. Element 306 indicates the additional social network relationship represented by 302 and the access as indicated by 304. In 306, user A2 has a defined social network of B2 as represented by edge 302. A is on node A2's access control list and A can view A2's social networks. As described above, node A2 has access to its own social network and this is not represented in 310. In the example 310, A has access to the lists representing social networks of A1, A2 and B2. In this case, A inquires whether A is related to B2. The answer is yes and there are 2 paths by which A is connected to B2: a first path A, A1, B2 and a second path A, A2, B2. With the access control lists as illustrated in FIG. 6 for A, an embodiment may indicate either of the foregoing two paths in response to the inquiry of how A is related to B2. One embodiment may return the first path determined. If there is more than one path, an embodiment may also return a predetermined number of paths such as the first 2 paths.

In summary, as just described, there may be more than one path by which a first node is connected to a second node. If the first node can view all the nodes on at least one path to the second node (i.e., first node has permission to access each list providing the link between nodes in the path), then the first node is told that the first node is connected to the second node. Otherwise, if the first node does not have appropriate access to view all nodes on at least one path to the second node, the first node is told that there is no relationship to the second node.

Figure 6A:
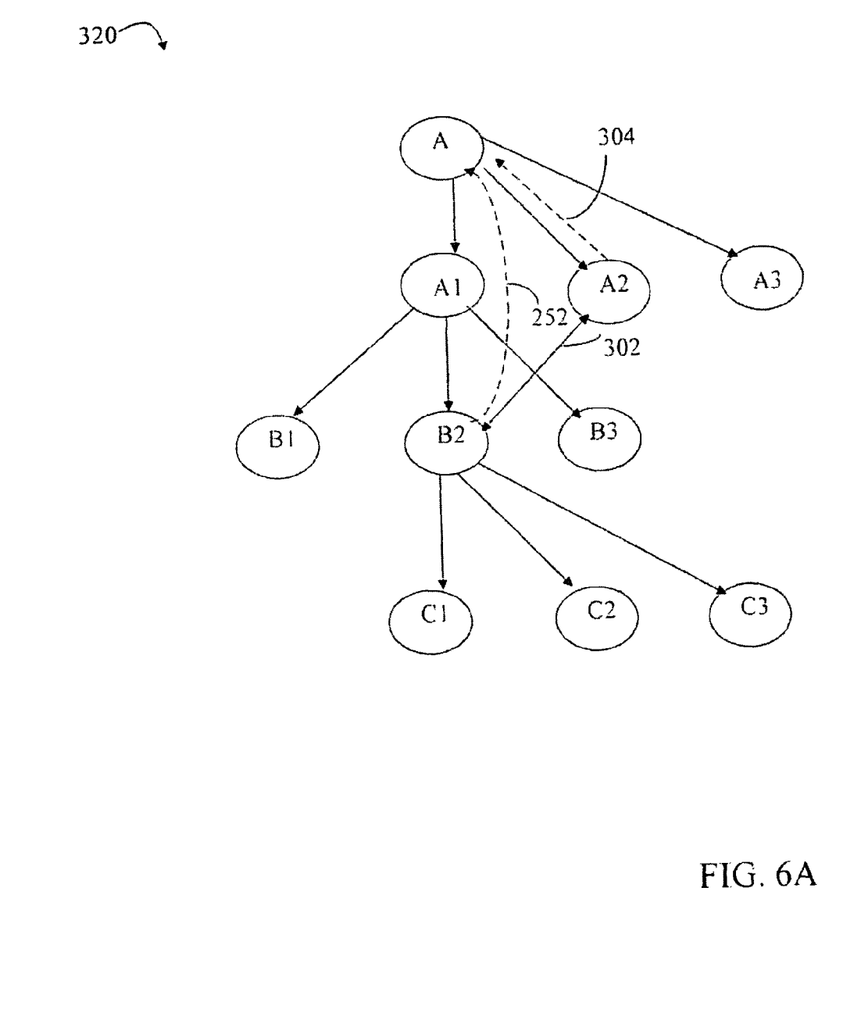
FIG. 6A is an example using a variation of the graph from FIG. 6.

Referring to FIG. 6A, shown is an example 320 that is a variation to the graph of FIG. 6. The example 320 includes the graph 310 of FIG. 6 with the removal of the dashed edge 254. By removing edge 254, the example 320 illustrates a graph representing the case in which A is not on A1's access control list and A cannot see A1's list. A is only allowed to view the social network lists of A2 and B2. In accordance with the example 320, if A inquires whether A is related to B2, the answer is yes. A cannot view A1's social networks even though A is connected to B2 via the path A, A1, B2 since this information is not exposed to A. Thus, A is not told about the path A, A1, B2. However, A is told A is connected to B2 via the path A, A2, B2. In connection with the breadth-first search performed to determine the path A, A2, B2, the node A2 is processed when evaluating nodes which are 1 hop from the inquiring node, A. Descendant nodes of A1 are not considered since A is not on A1's access control list, and node A3 has no children. When evaluating A2, it is determined that A is on A2's access control list so node B2 is considered. B2 is 2 hops from node A. A is on node B2's access control list so children of B2, nodes C1, C2 and C3, are considered when evaluating nodes which are 3 hops from A. In connection with the traversal of the graph for all paths which are within 3 hops from A, processing stops since nodes C1, C2 and C3 are at the maximum distance of 3 hops. At this point, the paths traversed are examined and it is determined that there is a path from A to B2 as described above.

With reference, to the graph of FIG. 6A (e.g., when edge 254 is removed), suppose A then makes an inquiry to determine all users related to A within a distance of 3 hops. In response, A is told A is related to A1, A2, A3 (directly), B2, and C1, C2 and C3. In connection with this inquiry, the same breadth-first search as described above may be performed as a first step. As a second step, the paths traversed during the breadth-first search are examined. All nodes located within a requested distance, such as 3 hops, are determined and may be output as a result.

In connection with the number of hops used as a maximum distance in connection with the techniques herein, the number of hops may be implicitly or explicitly defined. As described above, a default distance, such as 3 hops, may be used. The number of hops may also be specified as a configurable parameter in connection with any operation described herein or which may otherwise be performed using the techniques herein with an access control list.

In connection with the access control lists used with the social networks described herein, the access control lists may be defined in a variety of different ways. Using a first technique, the access control lists may be explicitly defined by enumerating each user on the access control list. Using another technique, a user may define an access control list using one or more existing social networks. For example, user A2 may define members of an access control list using one of A2's existing social networks and/or other public social network (e.g., all users who work for a particular company, live in a particular region, went to a particular school, and the like).

As another example, A may implicitly define an access control list based on nodes or users which are within a certain distance (e.g., number of hops away). In this latter case, the social networks respecting access control lists may be used to determine a set of nodes which are within a specified distance from node A. All such nodes may be included implicitly in A's access control list and allowed to view A's social networks. This implicit technique for defining members of an access control list may be performed as an alternative to explicitly naming each user of the access control list. To further illustrate, reference is made to the social networks defined in FIG. 4 and as represented by the solid edges in FIG. 5. A may define its access control list to include those users which are within 2 hops, or a distance of 2 or less, from node A. In such an instance, A's access control list includes A1, A2, A3, B1, B2 and B3. A may have, for example, a "friends" social network defined including A1, A2 and A3. A2 may have a "friends" social network defined including B1, B2, and B3. A's access list is defined to include those users which are "friends" of A (e.g., A1, A2 and A3), and also "friends" of A's "friends" (e.g., "friends" of A1, A2 and A3). It should be noted that rather than implicitly define an access control list as including all users which are related within a particular distance to a node via existing social networks, an access control list may also be defined to include users which are at one or more selected distances, such as nodes which are a distance of 2, but not include in the access control list those nodes which are at a distance of 1.

Figure 7:
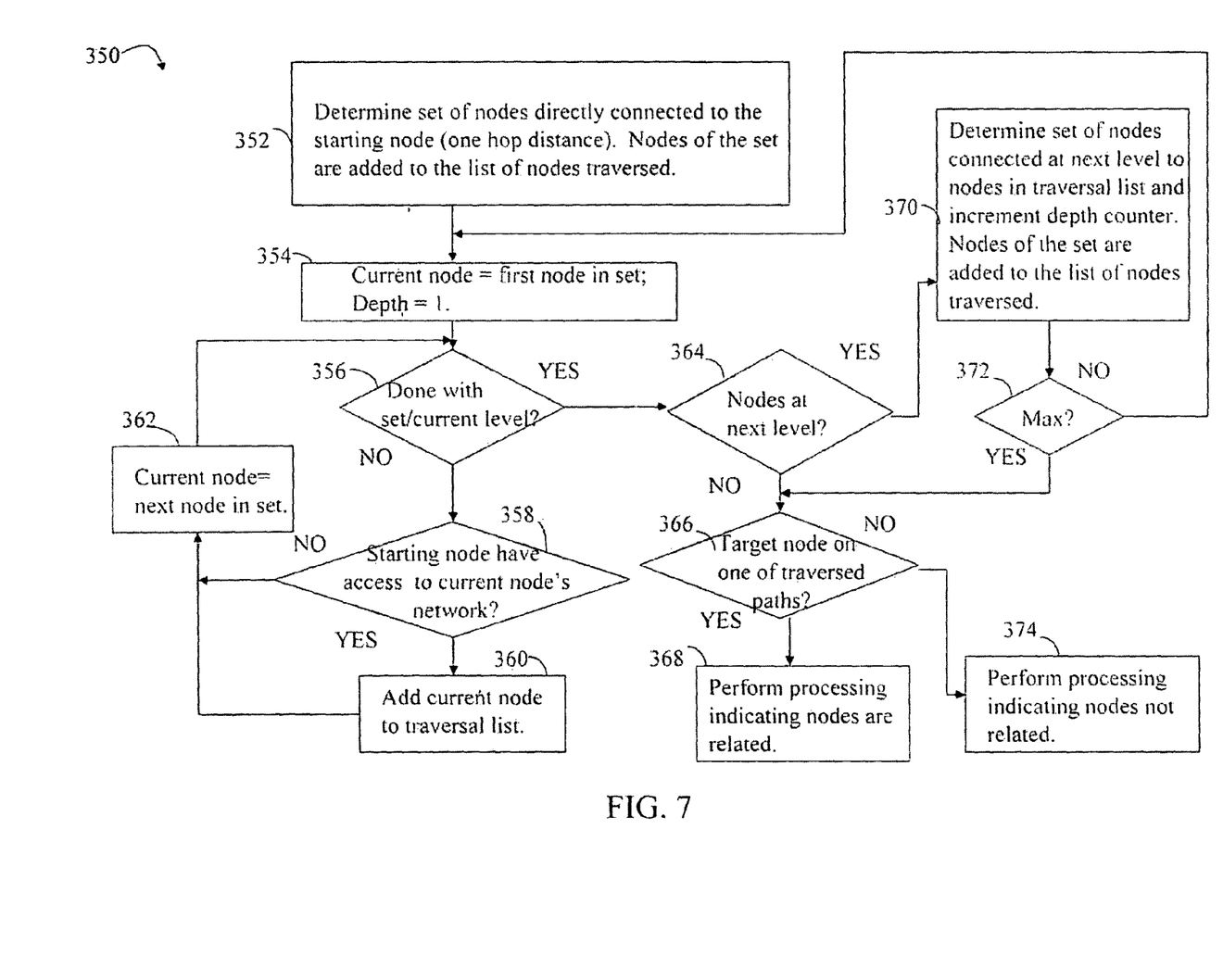
FIG. 7 is a flowchart of processing steps utilizing social networks and access control lists when determining whether there is a path between two nodes.

Referring to FIG. 7, shown is a flowchart of processing steps that may be performed in an embodiment to determine whether two nodes are related to one another. As described above, a node may inquire as to whether the node is related to another node. The inquiry may be answered by determining whether there is a path connecting the two nodes in accordance with the access control lists for the social networks used to form the path. With reference to FIG. 7, the inquiry is whether there is a path from a starting node to a target node in which all nodes on the path are visible to the starting node with the visibility being indicated in the access control lists. The steps of 350 summarize processing as described in connection with the examples of FIGS. 3, 4, 5, 5A, 6 and 6A above in an embodiment performing a breadth-first traversal of the graph of social network relationships originating from the starting or inquiring node. Subsequently, the paths traversed are examined to determine whether there is a path from the starting node to the target node. The steps of the flowchart 350 may be performed in an embodiment utilizing a bidirectional edge representation (e.g., as in FIG. 3) or a unidirectional edge representation (e.g., as in FIGS. 5, 5A, 6 ad 6A) in connection with social networks.

At step 352, a set of nodes directly connected (a distance of 1) to the starting is determined. As part of step 352, the list of nodes traversed is updated to include the set of nodes determined in step 352. The list of nodes traversed may represent those nodes which are traversed in connection with the breadth-first traversal. At step 354, traversal begins with the current node assigned as the first node in the set from step 352. Also, the current depth counter is set to 1 to indicate the current level of the traversal. At step 356, a determination is made as to whether processing is complete for the current level or distance, such as all nodes at a distance of 1. The loop formed by steps 356, 358, 360 and 362 examine all nodes at a current depth level or distance in the graph. If the starting node is on the access control list of a node at the current level, the node is added to a traversal list so that its children may be explored when traversing the next level in the breadth-first traversal.

If step 356 evaluates to no, control proceeds to step 358 where a determination is made as to whether the starting node has access to the current node's social network. If the starting node is on the current node's access control list, step 358 evaluates to yes and control proceeds to step 360 where the current node is added to the traversal list. The traversal list includes nodes visited at different levels in the traversal whose descendants may be further explored when performing the breadth-first search for subsequent distances or levels. From step 362, control proceeds to step 362 where current node is assigned the next node in the set of nodes at the current level or distance. If step 358 evaluates to no, control proceeds directly to step 362. From step 362, control proceeds to step 356.

If step 356 evaluates to yes indicating that all nodes at a current depth level or distance from the starting node have been processed, control proceeds to step 364. At step 364, a determination is made as to whether there are any nodes in the traversal list located at the next level. If so, step 364 evaluates to yes and control proceeds to step 370 to commence processing for the next depth level in the graph. At step 370, a set formed from the children of the nodes in the traversal list are determined. The set formed in step 370 is the set of nodes having a distance at the next depth level which are processed as part of the breadth-first traversal. As part of step 370, the list of nodes traversed is updated to include the set of nodes determined at the next depth level. Also, the depth counter is incremented in step 370 indicating the advancement in processing to the next level in the breadth-first technique. At step 372, a determination is made as to whether the current depth level as indicated by the depth counter is at the maximum distance under consideration. As described above, the maximum distance represents a configurable or default heuristic used to determine the bounds of the breadth-first search. If step 372 evaluates to no, control proceeds to step 354 to process nodes at the current depth level. If step 372 evaluates to yes, control proceeds to step 366 signifying the end of the breadth-first traversal.

If step 364 evaluates to no indicating that there are no nodes in the traversal list to be explored, control also proceeds to step 366.

At step 366, all paths visible from the starting node have been determined and traversed in a breadth-first fashion and a determination is made as to whether the target node is included in one of the paths traversed. Such a determination may be made, for example, by determining whether the target node is a node traversed as part of the breadth-first search traversal. The set of nodes which have been traversed may be represented as the set union of the starting node, the nodes forming the set from step 352, and the nodes forming the set for each iteration of step 370. As described above in connection with the flowchart 350, this set of traversed nodes has been updated in connection with the processing of steps 352 and 370. If step 366 evaluates to yes, control proceeds to step 368 to perform processing indicating that the starting and target nodes are related. Step 368 processing may include outputting the particular path indicating the relationships linking the starting and target nodes. To output the path information, as the nodes are traversed, information may be recorded indicating the relationship links or solid edge information of the graph connecting parent and child nodes. If step 368 evaluates to no, control proceeds to step 374 where processing is performed to indicate that the starting node and target node are not related. As described herein, a conclusion that the two nodes are not related means that there is no path between the nodes visible to the starting node. There may be a path between the nodes, but in such an instance, the starting node is not included on the necessary access control lists so that the path is visible to the starting node.

Figure 8:
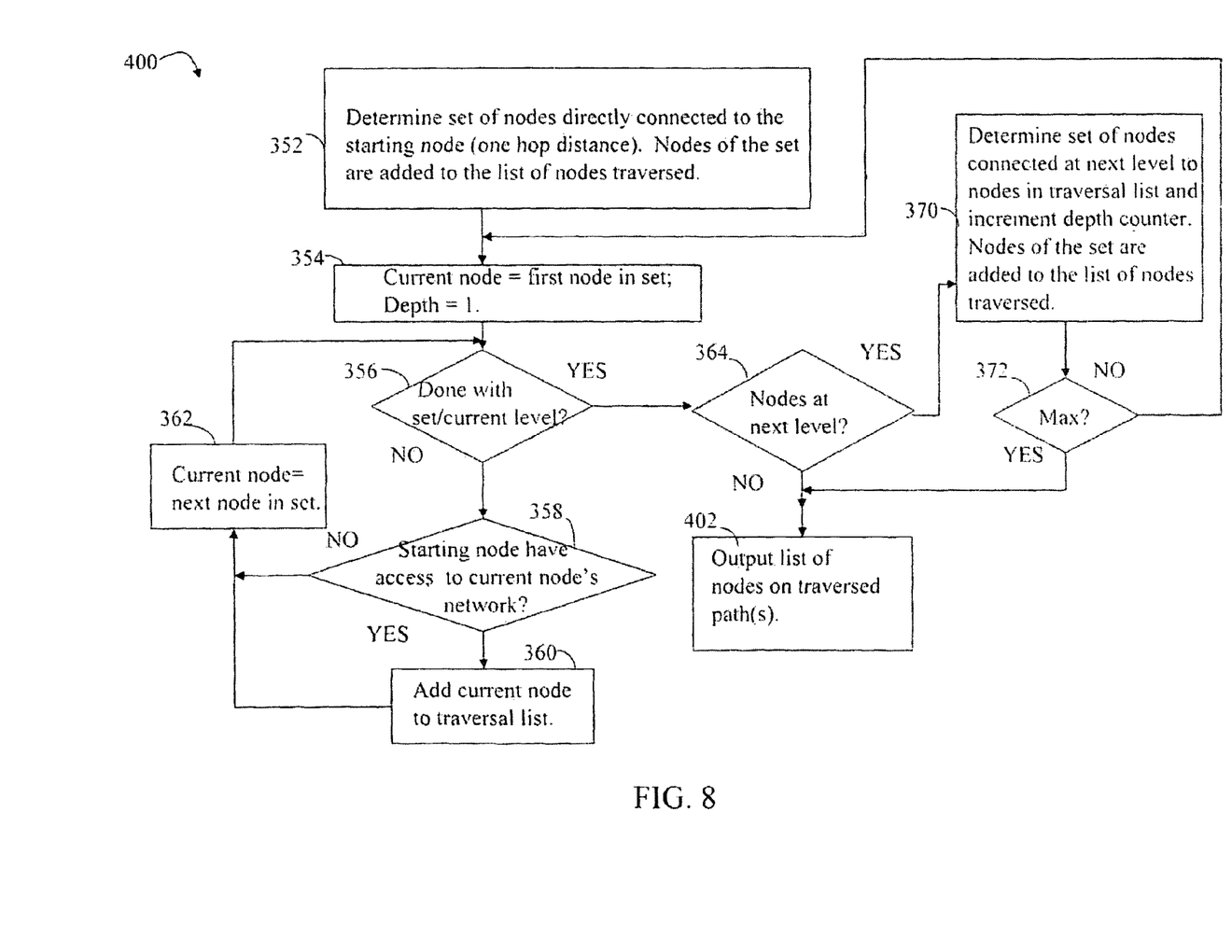
FIG. 8 is a flowchart of processing steps utilizing social networks and access control lists when determining a list of nodes within a particular distance from an inquiring node.

Referring to FIG. 8, shown is a flowchart of processing steps that may be performed in an embodiment to determine all nodes within a particular distance from a starting node. The processing steps of 400 are as described in 350 with the difference that step 402 is performed in FIG. 8 rather than steps 366, 368 and 374 as in FIG. 7. In 400, a breadth-first traversal of the graph formed from social networks and access control lists may be performed to determine all nodes within a particular distance from the starting node. Once the breadth-first traversal is complete, control proceeds to step 402 where the list of nodes included on the paths traversed may be output.

The techniques herein may be used to evaluate and determine relationships between users for a variety of different purposes. For example, if a website is used for professional networking such as employer and employee relationships, use of social networking lists and access control lists as described herein may be used to determine what individuals to use in order to obtain an introduction to potential employer. As another example, the techniques herein may be used in connection with websites where goods are sold to determine the trustworthiness and reputation of a seller.

The techniques herein may be used to display and search connectedness of social networks while respecting the access protections indicated by access control lists. It should be noted that an embodiment may use the breadth-first technique for traversing the graph representing the social networks and access control lists as described herein. It will be appreciated by those skilled in the art that other techniques, such as a depth-first technique, may be utilized as well as different representations of the defined social networks besides as described herein. For purposes of illustration, the techniques herein have been described in using a graph. However, other representations using various data structures may also be utilized.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for determining whether a first user and a second user of a social networking website are connected comprising:
    allowing, by a server of the social networking website, each user to define a social network list, the social network list defined by a user indicating other users having a direct relationship with the user;
    allowing, by the server, each user to define an access control list, the access control list defined by a user indicating other users granted access to view direct relationships indicated by the social network list defined by the user;
    receiving, by the server, an inquiry from the first user to discover whether the first user is indirectly related to a second user through one or more other users;
    determining, by the server, that a distance represented by a number of hops between the first user and the second user is within a maximum distance;
    receiving, by the server, a graph representing the social network lists and the access control lists defined by each of the first user and the one or more other users between the first user and the second user, wherein:
    the graph includes all paths connecting a starting node representing the first user and a target node representing the second user which are within the maximum distance,
    each path of the graph includes links connecting the starting node and the target node through one or more intervening nodes representing each of the one or more other users between the first user and the second user, and
    if a user represented by an intervening node in one more paths of the graph has defined an access control list which includes the first user, an edge connecting the intervening node and the starting node is included in the one or more paths of the graph to indicate that the first user has been granted access to view direct relationships indicated by a social network list defined by the user represented by the intervening node;
    traversing, by the server, the graph to determine a viewable path from the starting node to the target node, wherein each intervening node in the viewable path is connected to the starting node by an edge indicating that the first user has been granted access to view the direct relationships indicated by each social network list defined by each user represented by each intervening node; and
    outputting, by the server, the viewable path in response to the inquiry from the first user.

2. The method of claim 1, wherein a breadth-first technique is performed to determine the paths connecting the starting node and the target node.

3. The method of claim 1, wherein at least one path in the graph includes an intervening node at a current level of traversal that represents a user who is included in the social network list defined by the first user.

4. The method of claim 3, wherein the at least one path in the graph includes a descendant node at a next level of traversal that represents a user who is included in the social network list defined by the user represented by the intervening node at the current level of traversal.

5. The method of claim 4, wherein a determination is made as to whether the first user is included in the access control list defined by the user represented by the intervening node at the current level of traversal before proceeding to the descendant node at the next level of traversal.

6. The method of claim 5, wherein the descendant node is traversed if there is an edge connecting the intervening node at the current level of traversal and the starting node.

7. The method of claim 1, further comprising:
determining, by the server, all paths originating from the starting node which are within the maximum distance.

8. The method of claim 7, further comprising:
determining, by the server, whether the target node is included in one of the paths originating from the starting node.

9. The method of claim 1, further comprising:
determining, by the server, a plurality of viewable paths from the starting node to the target node; and
outputting, by the server, a response to the inquiry from the first user that indicates the plurality of viewable paths.

10. The method of claim 1, wherein a user defines an access control list by explicitly listing each other user included in the access control list.

11. The method of claim 1, wherein a user defines an access control list implicitly by defining a particular distance.

12. The method of claim 1, wherein the access control list defined by the first user includes all users included in the social network list defined by the first user.

13. The method of claim 1, wherein the access control list defined by the first user does not include all users included in the social network list defined by the first user.

14. A computer readable storage medium that does not consist of a signal, the computer readable storage medium storing computer-executable instructions that, when executed, cause a computing device to perform a computer-implemented method for determining whether a first user and a second user of a social networking website are connected, the method comprising:
allowing each user to define a social network list, the social network list defined by a user indicating other users having a direct relationship with the user;
allowing each user to define an access control list, the access control list defined by a user indicating other users granted access to view direct relationships indicated by the social network list defined by the user;
receiving, from the first user, an inquiry to discover whether the first user is indirectly related to a second user through one or more other users;
determining that a distance represented by a number of hops between the first user and the second user is within a maximum distance;
receiving a graph representing the social network lists and the access control lists defined by each of the first user and the one or more other users between the first user and the second user, wherein:
the graph includes all paths connecting a starting node representing the first user and a target node representing the second user which are within the maximum distance,
each path of the graph includes links connecting the starting node and the target node through one or more intervening nodes representing each of the one or more other users between the first user and the second user, and
if a user represented by an intervening node in one more paths of the graph has defined an access control list which includes the first user, an edge connecting the intervening node and the starting node is included in the one or more paths of the graph to indicate that the first user has been granted access to view direct relationships indicated by a social network list defined by the user represented by the intervening node;
traversing the graph to determine a viewable path from the starting node to the target node, wherein each intervening node in the viewable path is connected to the starting node by an edge indicating that the first user has been granted access to view the direct relationships indicated by each social network list defined by each user represented by each intervening node; and
outputting the viewable path in response to the inquiry from the first user.

15. The computer readable storage medium of claim 14, wherein the access control list defined by the first user includes all users included in the social network list defined by the first user.

16. The computer readable storage medium of claim 14, wherein the access control list defined by the first user does not include all users included in the social network listed defined by the first user.

17. The computer readable storage medium of claim 14, wherein method further comprises:
determining a plurality of viewable paths from the starting node to the target node; and
outputting a response to the inquiry from the first user that indicates the plurality of viewable paths.

18. A computing device comprising:
a processor for executing computer-executable instructions; and
memory storing computer-executable instructions for performing a method to determine whether a first user and a second user of a social networking website are connected, the method comprising:
allowing each user to define a social network list, the social network list defined by a user indicating other users having a direct relationship with the user;
allowing each user to define an access control list, the access control list defined by a user indicating other users granted access to view direct relationships indicated by the social network list defined by the user;
receiving, from the first user, an inquiry to discover whether the first user is indirectly related to a second user through one or more other users;
determining that a distance represented by a number of hops between the first user and the second user is within a maximum distance;
receiving a graph representing the social network lists and the access control lists defined by each of the first user and the one or more other users between the first user and the second user, wherein:

the graph includes all paths connecting a starting node representing the first user and a target node representing the second user which are within the maximum distance, each path of the graph includes links connecting the starting node and the target node through one or more intervening nodes representing each of the one or more other users between the first user and the second user, and if a user represented by an intervening node in one or more paths of the graph has defined an access control list which includes the first user, an edge connecting the intervening node and the starting node is included in the one or more paths of the graph to indicate that the first user has been granted access to view direct relationships indicated by a social network list defined by the user represented by the intervening node;

traversing the graph to determine a viewable path from the starting node to the target node, wherein each intervening node in the viewable path is connected to the starting node by an edge indicating that the first user has been granted access to view the direct relationships indicated by each social network list defined by each user represented by each intervening node; and outputting the viewable path in response to the inquiry from the first user.

19. The computing device of claim 18, wherein the access control list defined by the first user does not include all users included in the social network list defined by the first user.

20. The computing device of claim 18, wherein the method further comprises:

determining a plurality of viewable paths from the starting node to the target node; and outputting a response to the inquiry from the first user that indicates the plurality of viewable paths.

* * * * *